United States Patent [19]
Williams et al.

[11] Patent Number: 5,915,215
[45] Date of Patent: Jun. 22, 1999

[54] PRIVATE CELLULAR TELEPHONE SYSTEM

[75] Inventors: Roland E. Williams; Michael R. Lee; Dan M. McDonald, all of Calgary, Canada

[73] Assignee: Harris Canda, Inc., Calgary, Canada

[21] Appl. No.: 08/242,806

[22] Filed: May 13, 1994

Related U.S. Application Data

[63] Continuation of application No. 08/111,775, Aug. 25, 1993, abandoned, which is a continuation of application No. 07/962,011, Oct. 15, 1992, abandoned, which is a continuation of application No. 07/831,628, Feb. 6, 1992, abandoned, which is a continuation of application No. 07/517,923, May 2, 1990, abandoned.

[51] Int. Cl.$^6$ ........................................... H04Q 7/38

[52] U.S. Cl. ................................ 455/422; 455/403

[58] Field of Search ............................. 379/58–61, 63

[56] References Cited

U.S. PATENT DOCUMENTS

| | | |
|---|---|---|
| 4,242,538 | 12/1980 | Ito et al. . |
| 4,654,879 | 3/1987 | Goldman et al. . |
| 4,672,658 | 6/1987 | Kavehrad et al. ........................ 379/61 |
| 4,741,019 | 4/1988 | Takahashi . |
| 4,768,218 | 8/1988 | Yorita . |
| 4,771,448 | 9/1988 | Koolgoli et al. .......................... 379/59 |
| 4,776,001 | 10/1988 | Murata et al. . |
| 4,790,000 | 12/1988 | Kinoshita .................................. 379/61 |
| 4,817,190 | 3/1989 | Comroe et al. ........................... 379/63 |
| 4,831,373 | 5/1989 | Hess ........................................ 455/33 |
| 4,875,231 | 10/1989 | Hara et al. ............................... 379/63 |
| 4,939,785 | 7/1990 | Murata et al. ........................... 379/61 |

*Primary Examiner*—Dwayne D. Bost

[57] ABSTRACT

In a more economical system for connecting cellular mobile telephone terminals to wire lines, a stand-alone base station comprising modular transceivers alternately tunable to the base station control channel and individual voice channels.

5 Claims, 3 Drawing Sheets

|  XCVR1 | XCVR2 | XCVR3 |
|---|---|---|
| VOICE | VOICE | CONTROL |
| VOICE | CONTROL | VOICE |
| CONTROL | VOICE | VOICE |
| VOICE | VOICE | VOICE |

FIG. 3

PRIVATE CELLULAR TELEPHONE SYSTEM

This application is a continuation of 08/111,775 filed Aug. 25, 1993, abandoned, which is a continuation of 07/962,011 filed Oct. 15, 1992, abandoned, which is a continuation of 07/831,628 filed Feb. 6, 1992, abandoned which is a continution of 07/517,923 filed May 2, 1990, abandoned.

FIELD OF THE INVENTION

This invention is generally related to the field of cellular telephones. The invention provides a means for connecting mobile or subscriber cellular telephones to wire lines without complex digital switches in situations in which full cellular service is inappropriate or unavailable.

BACKGROUND OF THE INVENTION

In a cellular telephone system, a "subscriber" or "mobile" radiotelephone terminal unit, which may be an automobile-based, portable, or hand-held transceiver, having no fixed location communicates with a fixed, "base" radiotelephone station that is located in and acts as a communications "hub" for a particular and generally exclusive geographic region known as a "cell." Once communication is established between a given mobile terminal and base station and the mobile terminal is moved into another cell, communications with the terminal is "handed off" from the first base station to the base station for the second cell. Typically the base station is linked to a conventional local telephone trunk so that the mobile user can communicate with a conventional "wire line" (which itself may include radio transmission) telephone user from his mobile terminal.

The past decade has seen the rise of cellular telephones operating under protocols such as "AMPS" (Advanced Mobile Phone Service) or "TACS" (Total Access Communications System), respectively specified in the EIA Interim Standards IS-3-D, IS-19-A, and IS-20-A and in the United Kingdom Total Access Communications System: Mobile Station-Land Station Compatibility Specification. Generally, the implementation of these cellular telephone protocols allow two-way, fully duplexed communication between mobile terminals and base stations, each connected to a wire line, serving a limited geographic area and having the capability of handing off a communication to a second base station as the mobile terminal enters into the second base station's service area or cell. Each base station is allocated a set of numerous frequency pairs (voice channels), each pair to allow duplex operation, to allow simultaneous separate service of numerous mobile terminals. Control functions are generally communicated over a single control channel for a given cell. These include requests and acknowledgments from and to mobile terminals for call set-ups. Different voice and control channels are used as between adjacent cells. Typically, the base stations use one transceiver per channel, with the first transceiver on a rack being the one dedicated to the cell's control channel.

In normal cellular telephone operation, the base station is connected by wire line to a central switching complex, known as a "mobile telephone switching office," at which all call routing functions, including handing off, typically are performed. Thus, for example, a mobile terminal call addressed to another mobile terminal, even within the same cell, is directed by the base station to the mobile telephone switching office for routing back to the base station for connection with the addressee terminal.

There are situations in which normal cellular operation including the above-mentioned features is not available or even appropriate. As examples, thinly populated and traveled areas and radio isolated areas such as underground garages generally are not appropriate for full cellular service by expensive full-function base stations and digital switching equipment. Nonetheless, given the large number of cellular mobile terminals now in use, and, in many cases, installed in automobiles, it clearly would be a valuable extension of service of the mobile terminals to allow their use in situations in which full cellular service is not available.

SUMMARY OF THE INVENTION

In summary, the invention provides an economical means for connecting a cellular mobile terminal to a wire line by employing a limited-function base station comprising a central processing unit and one or more transceivers capable of communicating on and switching between voice and control channels used in full cellular operation. The use of dual function transceivers affords the additional advantages of reducing the number of transmitters required in a base station, allowing a minimum configuration of a single transceiver, and, in the case of a multi-transceiver base station, allowing continued operation even if the transceiver dedicated to the control channel fails.

As a "stand-alone" base station, that is, one that performs no handing-off function, the invention is compatible with the installed base of cellular mobile terminals and extends their use without the cost of expensive digital switching equipment. With relatively few transceivers and no switching equipment, the base station may be portable. The invention may be implemented in an "originate only" mode or with the paging functions used in normal cellular operation. In terminal-to-terminal (mobile-to-mobile) communication, the invention does not require routing over the wire line to a mobile telephone switching office as required in normal cellular operation.

BRIEF DESCRIPTION OF THE DRAWINGS

In order that the invention may be more clearly understood, reference is made to the accompanying drawings which show the preferred embodiment and details of its operation:

FIG. 3 depicts possible transceiver configurations in the preferred embodiment of the base station of the invention.

DETAILED DESCRIPTION OF AN ILLUSTRATIVE EMBODIMENT

Figure 1:
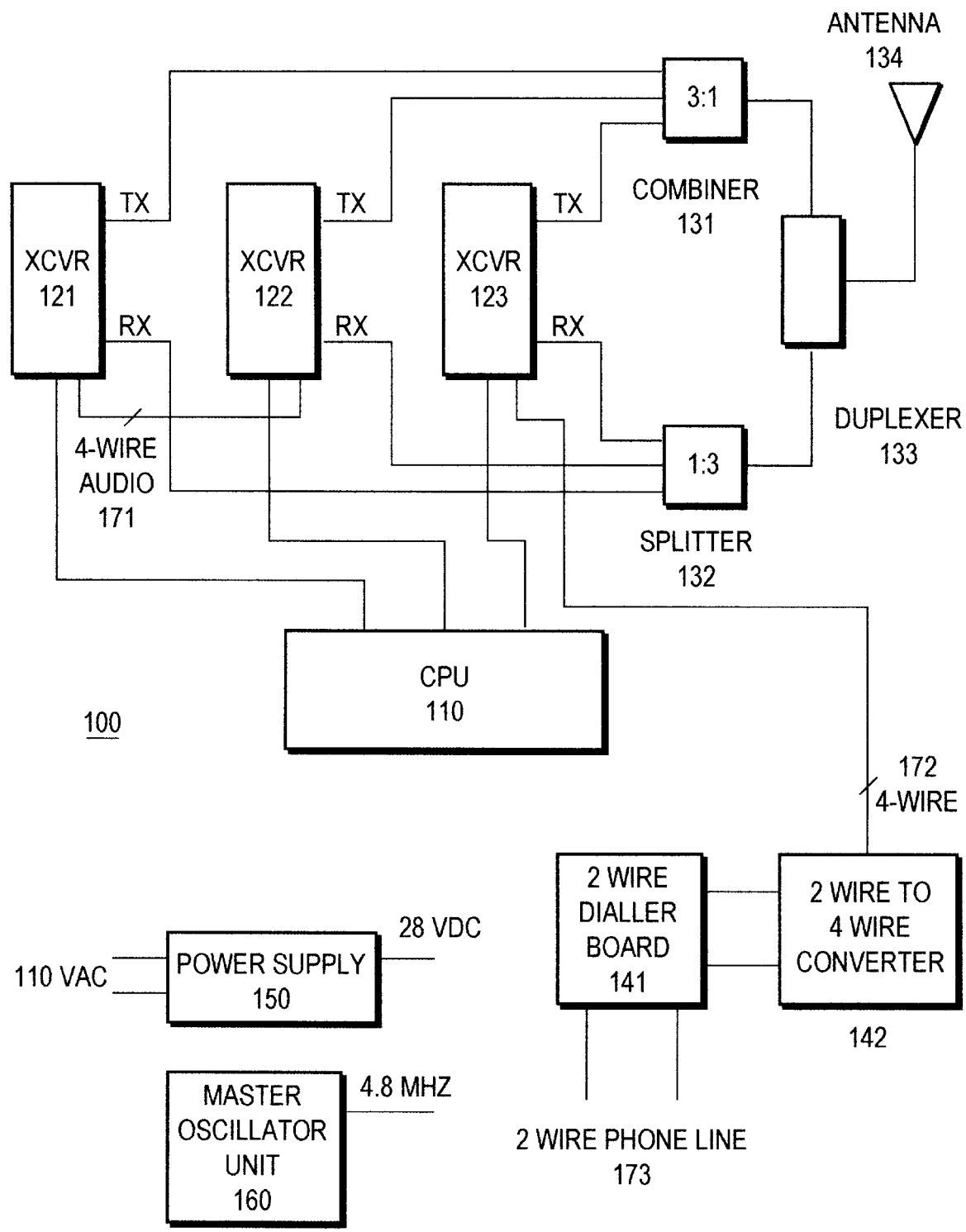
FIG. 1 is a block diagram of a preferred embodiment of the base station of the invention.

FIG. 1 shows an embodiment of the base station 100 implemented with three transceivers (121, 122, and 123) each switchable from a voice channel to a control channel and back at command, in this implementation, given by central processing unit (CPU) 110. The transmitter outputs of the transceivers (121, 122, and 123) are connected to combiner 131, duplexer 133 and antenna 134 in a known manner, and the receiver inputs of the transceivers (121, 122, and 123) are derived from antenna 134 by means of the duplexer 133 and splitter 132. Base station 100 is implemented with power supply 150 connectable to a standard 110 VAC (or 220 VAC) source and with master oscillator unit 160.

Base station 100 is shown as implemented with transceivers 121 and 122 connected by a four-wire audio link 171 to provide mobile-to-mobile communication on the voice channels used by those transceivers. Transceiver 123 is connected by a four-wire link 172 to a converter 142 for connection by dialer board 141 to a telephone line 173.

Figure 2:
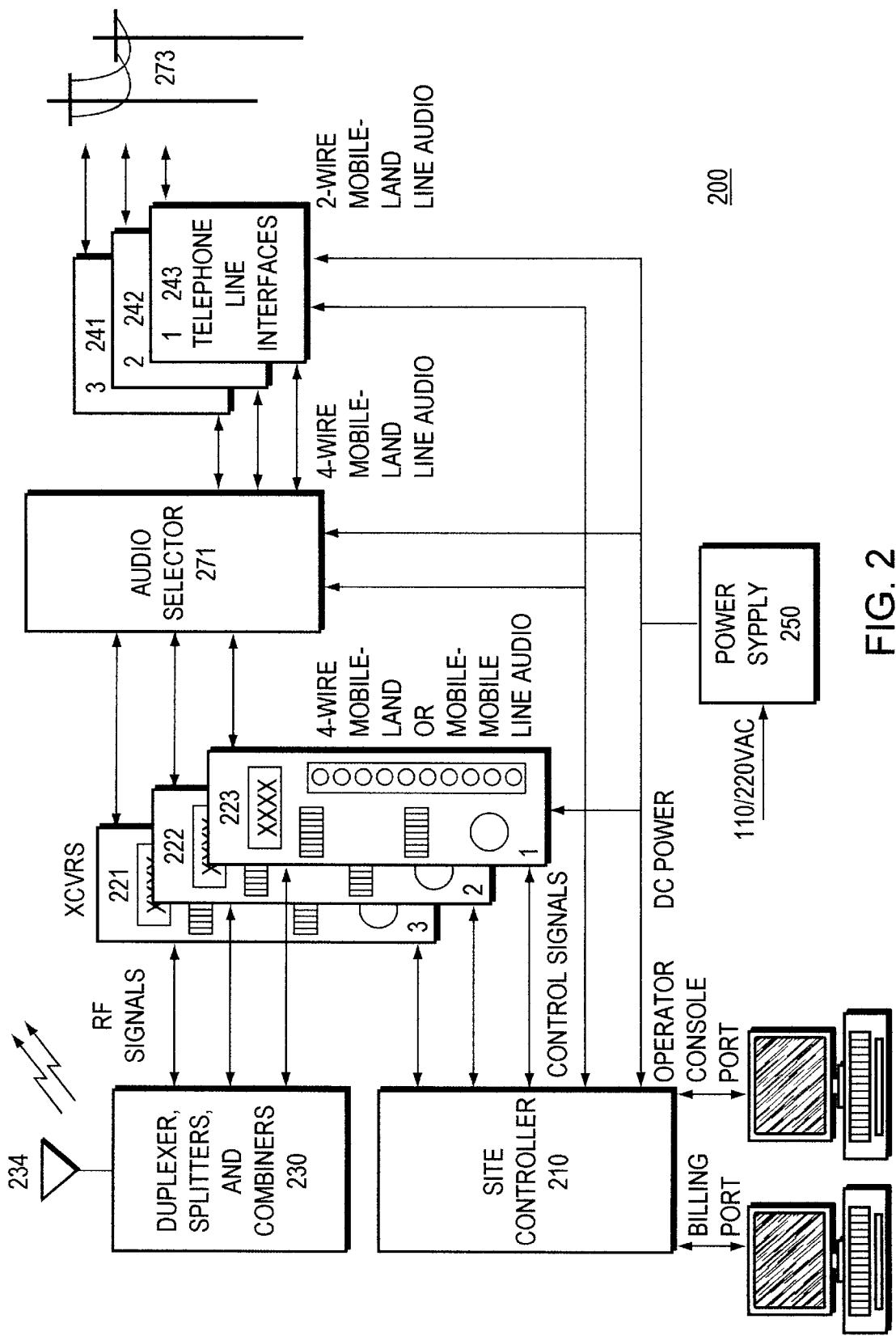
FIG. 2 is a block diagram of an alternative embodiment of the base station of the invention.

These connections are generalized in FIG. 2, which shows an alternative embodiment with base station 200, using audio selector 271 to connect any of transceivers (221, 222, and 223) to each other or to any of telephone line interfaces (241, 242, and 243) to allow any of the transceivers to engage in mobile-to-mobile communications among one another or in mobile-to-land (wire line) communications over wire line 273.

In either embodiment, when the CPU 110 in FIG. 1 or controller 210 in FIG. 2 receives a request from a mobile terminal (not shown) on the control channel, it determines whether to process the call on the basis of factors including whether the call is authorized and whether a requested connection is possible. If the call is to be set up, the CPU or controller transmits over the control channel to the requesting terminal an assignment of a voice channel corresponding to an available transceiver, generally, in the preferred embodiment, the transceiver transmitting the control signals. The CPU or controller then switches that transceiver to its voice channel from the control channel and assigns another available transceiver (not engaged in a conversation) to the control channel.

In the case of mobile-to-mobile communications, the call set-up includes a paging of the addressee terminal and an assignment of a second voice channel to that terminal if acknowledgement is received and communications permitted by the CPU or controller. This would occupy two transceivers, but, unlike normal cellular operation, would not require communication over the wire line. Land-to-mobile communications may be initiated by paging and acknowledgment analogous to normal cellular operation, that is, by transmission of a page and receipt of acknowledgment over the control channel, followed by the assignment of a voice channel.

FIG. 3 shows the possible transceiver states in a three-transceiver implementation of the base station of the invention. When all the transceivers are in active voice state, the system is busy and mobile originations are not possible because there is no control channel open. When one of the calls is terminated, the base station transceiver that has been released will switch back to an active control state. Thus, whenever possible, there will be one control channel open.

The above are illustrative embodiments of the invention. As few as one transceiver may be used in the base station, or as many transceivers as allowed by frequency allocations.

Having described this invention, what is claimed as new and secured by Letters Patent are:

1. A method for operating a radiotelephone base station including one or more standard cellular telephone cell site transceivers to allow standard cellular telephone terminals to set up and communicate over a wire line, said method comprising the steps of:

A) tuning a first transceiver in said base station unit to a control channel only if said first transceiver is not engaged in voice communications;

B) receiving a set up request from one of said cellular telephone terminals over said control channel;

C) signalling said cellular telephone terminal to tune to a voice channel in response to receiving said set up request;

D) tuning said first transceiver to said voice channel regardless of whether this results in no transceiver in said base station unit being tuned to said control channel;

E) placing a wire line telephone call at said base station unit in accordance with said set up request;

F) communicating with said cellular telephone terminal over said voice channel; and G) tuning said first transceiver to said control channel upon completion of said communication only if no other transceiver in said base station unit is then tuned to said control channel.

2. The method of claim 1 further comprising the step of:

D1) tuning a second transceiver in said base station unit to said control channel only upon tuning said first transceiver to said voice channel if said second transceiver is not engaged in voice communications.

3. A method for operating a radiotelephone base station transportable as a unit to allow radiotelephone terminals to communicate, said method comprising the steps of:

A) tuning a first transceiver in said base station unit to a control channel only if said first transceiver is not engaged in voice communications;

B) receiving a set up request from a first radiotelephone terminal over said control channel;

C) signalling said first radiotelephone terminal to tune to a first voice channel in response to said set up request;

D) paging a second radiotelephone terminal in accordance with said set up request;

E) receiving an acknowledgment transmitted from said second radiotelephone signal;

F) signalling said second radiotelephone terminal to tune to a second voice channel in response to said acknowledgment;

G) tuning said first transceiver to said first voice channel regardless of whether this results in no transceiver in said base station unit being tuned to said control channel;

H) tuning a second transceiver in said base station unit to said second voice channel only if said second transceiver is not engaged in voice communications, but regardless of whether this results in no transceiver in said base station unit being tuned to said control channel;

I) establishing a communication link between said first and second tranceivers within said base station unit;

J) communicating with said first and second radiotelephone terminals over said first and second voice channels, respectively; and K) tuning one of said first or second transceivers to said control channel upon completion of said communication only if no other transceiver in said base station unit is then tuned to said control channel.

4. The method of claim 3 further comprising the step of:

I1) tuning a third transceiver in said base station unit to said control channel only upon tuning said first transceiver to said first voice channel and only if said third transceiver is not engaged in voice communications.

5. A radiotelephone base station transportable as a unit comprising:

A) a wire line interface, including a dialer for dialing numbers on the wire line;

B) at least two transceivers, each alternately tunable (i) to a common control channel to receive requests from and to transmit instructions to radiotelephone terminals and (ii) to a voice channel unique to each transceiver and used by said radiotelephone terminals;

C) means for connecting a transceiver to said wire line interface in one mode and to another transceiver in a second mode; and D) a controller comprising the following functions:
  i) ensuring that at most one transceiver is tuned to said control channel;
  ii) ensuring that, if at least one transceiver is not engaged in voice communications, at least one transceiver is tuned to said control channel;
  iii) if a wire line set up request is received from a radiotelephone terminal by a transceiver tuned to said control channel, transmitting instructions to said radiotelephone terminal to tune to the voice channel of said transceiver, tuning said transceiver to its voice channel regardless of whether this results in no transceiver in said base station unit being tuned to said control channel, connecting said transceiver to said wire line interface, and dialing a requested number on the dialer;
  iv) if a set up request is received from a first radiotelephone terminal for connection to a second radiotelephone terminal by a first transceiver tuned to said control channel, transmitting instructions to said first radiotelephone terminal to tune to the voice channel of said first transceiver, paging said second radiotelephone, transmitting instructions to said second radiotelephone to tune to the voice channel of a second transceiver, tuning said first transceiver to its voice channel regardless of whether this results in no transceiver in said base station unit being tuned to said control channel, and connecting within said base station unit said first transceiver to said second transceiver only if said second transceiver is not engaged in voice communications.

* * * * *